United States Patent [19]
Peterson, Jr.

[11] Patent Number: 4,927,305
[45] Date of Patent: May 22, 1990

[54] TIGHTENING DEVICE FOR THREADED CONNECTORS

[76] Inventor: Charles D. Peterson, Jr., P.O. Box 217, Richardson, Tex. 75080

[21] Appl. No.: 240,151

[22] Filed: Sep. 2, 1988

[51] Int. Cl.$^5$ .............................................. F16B 31/12
[52] U.S. Cl. ..................................... 411/14; 411/432; 403/362; 403/16
[58] Field of Search ................. 411/14, 8, 9, 432, 393; 403/362, 27, DIG. 6, 320, 16

[56] References Cited

U.S. PATENT DOCUMENTS

| | | | |
|---|---|---|---|
| 247,407 | 9/1881 | Ramsey | 411/393 |
| 1,092,155 | 4/1914 | March | 411/959 |
| 2,136,592 | 11/1938 | Mayer | 411/393 |
| 2,272,852 | 2/1942 | Schaefer | 411/393 |
| 2,936,667 | 5/1960 | Thorberg | 411/393 |
| 2,976,069 | 3/1961 | Meredith | 403/16 |
| 3,006,671 | 10/1961 | Opocensky | 403/362 |
| 3,289,519 | 12/1966 | Piccone | 403/362 |
| 3,479,072 | 11/1969 | Kosar | 411/393 |
| 3,618,994 | 11/1971 | Gepfert | 411/432 |
| 3,943,819 | 3/1976 | Charron | 411/14 |
| 4,338,037 | 7/1982 | Deminski | 403/320 |
| 4,525,114 | 6/1985 | Hirst . | |
| 4,622,703 | 11/1986 | Steinbock | 411/432 |
| 4,660,687 | 4/1987 | Williams | 411/432 |

FOREIGN PATENT DOCUMENTS

| | | | |
|---|---|---|---|
| 40565 | 11/1964 | German Democratic Rep. | 411/393 |
| 980090 | 1/1965 | United Kingdom | 411/14 |

Primary Examiner—Gary L. Smith
Assistant Examiner—F. Saether
Attorney, Agent, or Firm—Robbins & Robbins

[57] ABSTRACT

A fastener and tightening device for exerting force and equalization of force upon the nut or head of a bolt or threaded stud. The device is comprised of a shank fitting through a support member within an abutment head adapted to be drawn up tight against the support member. A plurality of jack bolts are threadedly engageable with holes in the head and are adapted to be tightened to exert pressure against the support member. Separate ball members are positioned between the jack bolts and a wear plate on the support member to minimize friction and provide for force equalization to counteract any off center alignment. The tightening device is particularly useful in a fastening device for equalization of pressure and stress gauging where the shank has a bore receiving a gauge pin fixed at one end in the bore with an opposite end extending through the head to support a rotary gauge which is free to rotate until the shank is stressed sufficiently to tighten the gauge against the head to indicate proper tensioning of the shank. By the use of the jack bolts appropriate tightening can be effected with proper equalization of force.

10 Claims, 1 Drawing Sheet

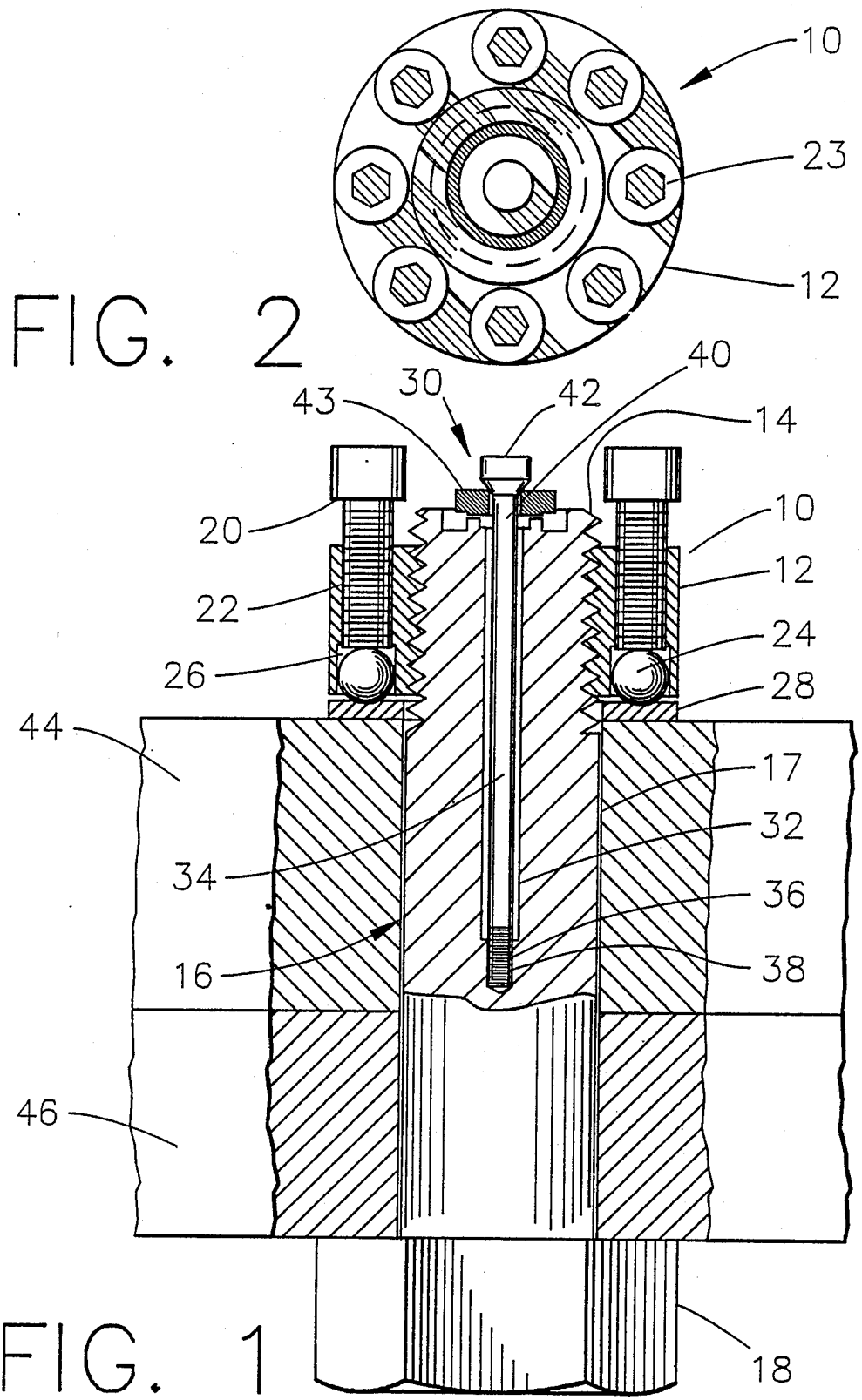

TIGHTENING DEVICE FOR THREADED CONNECTORS

BACKGROUND OF THE INVENTION

There have been used in the past various jack bolt devices for effecting the tightening of a nut of the head of a bolt against a support. In such devices the extreme pressure that may be exerted has provided a problem in the wear, friction and equalization of pressure to be exerted. In view of the extreme pressure that may be exerted and the desirability to provide ease in the application of the pressure and equalization of force to prevent distortion there has remained a need to provide a device to satisfy such requirements.

There have also been provided in the past various devices for sensing the stress placed upon the elongated shanks of bolts or studs employed to fasten together elements used in industry and construction. When such devices are used the stress placed upon the shank must be accurately sensed to determine the proper force used in tightening the elements to prevent accidental loosening with attendant danger to equipment and personnel should the elements be separated. Such devices should be capable of ease in tightening with ready accessability and proper pressure application to provide equalized stress distribution.

SUMMARY OF THE INVENTION

By means of this invention there has been provided a tightening device for exerting equalized pressure upon the abutment head of a bolt or stud. A plurality of jack bolts are employed with separate and discrete ball members between the jack bolts and a support against which the head is to be tightened.

The jack bolts are positioned about the periphery of the abutment head which may be a nut on a threaded end of a stud or the fixed head of a bolt. The bolts fit through threaded holes in the head and overlie a wear plate positioned between the balls and the support. In order to reduce friction and increase wear the balls may be made of a harder metal than the jack bolts and the ware plate. The wear plate may be constructed in the form of an easily replaceable washer fitting around a shank of the fastener and underlying the jack bolt holes and balls.

The tightening device is particularly useful in a fastener device having a gauge to determine the proper stress to be applied against a shank of a bolt or stud employed to fasten parts of heavy duty machinery, equipment or the like such as that shown in Hirst, U.S. Pat. No. 4,525,114. In such devices the shank of the fastener has a bore receiving a gauge pin anchored within the shank and extending through the shank and the tightening head which may be either a nut threaded on the end of the shank or a bolt head. A freely rotatable gauge is positioned on the free end of the pin which is adapted to be drawn against the support when the fastener is tightened to a sufficient degree to properly stress the shaft to prevent rotation of the rotatable gauge which indicates proper stressing of the fastener.

By the use of the jack bolts on the abutment head of the fastener device proper application of pressure and equalization of such pressure may be readily effected. Distortion may thereby be avoided. By the use of the balls and wear plate, friction and wear may also be minimized while enhancing proper force distribution.

The tightening device through the employment of readily available jack bolts, balls and wear plate provide a rugged, relatively inexpensive and simply employed structure which can be easily installed, employed and maintained.

The above features are object of this invention. Further objects will appear in the detailed description which follows and will be further apparent to those skilled in the art.

For the purpose of illustration of this invention, a preferred embodiment thereof is shown in the accompanying drawing. It is to be understood that the drawing is for purpose of description only and that the invention is not limited thereto.

IN THE DRAWING

FIG. 1 is a view in axial cross-section and partly in side elevation of the tightening device in a typical application; and FIG. 2 is a top plan view of the tightening device.

DESCRIPTION OF THE INVENTION

The tightening device of this invention is generally indicated by the reference numeral 10 in FIGS. 1 and 2. It is comprised of an abutment head 12 shown in the form of a nut having a cylindrical head internally threaded and fitted on the threaded end 14 of a bolt 16 having a shank 17 and a fixed head 18. It will be understood that a threaded stud may be employed and that the tightening device may also be employed on a fixed head of a bolt rather than a nut.

The tightening device 10 is comprised of a plurality of jack bolts 20 which are received in a plurality of threaded holes 22 extending through the periphery of the abutment head 12. The jack bolts may desirably be in the form of allen bolts having a hexagonal socket 23 receiving an allen wrench. This provides for easy access from a vertical position where lateral access is limited. It will also be understood that hexagonal heads may be utilized where vertical access is restricted.

A plurality of force or pressure steel ball elements 24 fitting closely within the holes 22 are positioned in a pocket 26 in the bottom of the holes which may be unthreaded to provide for optimum seating. Lubrication by way of grease in the pocket 26 between the balls and the lower ends of the bolts may be applied to minimize friction.

A wear plate 28 is positioned under the abutment head to minimize wear of the support against which the tightening device is brought to bear. The wear plate is conveniently in the form of a metal washer structure which fits around the threaded end portion 14 of the bolt and is co-extensive with the abutment head.

In order to minimize wear and friction the balls 24 are constructed of a metal such as steel having a hardness greater than the hardness of the metal jack bolts 20 and the wear plate 28. Upon forceful application of the jack bolts, the hardened ball will indent both the wear plate and the jack bolt. The relatively softer metal of the ends of the jack bolt and the wear plate will not be in contact with one another and the amount of friction and wear is thereby reduced thereby extending the life of the device and facilitating the application of pressure required for proper tightening.

A further feature in the use of the ball with the jack bolts is that where the bolt or stud that is being tightened is at an angle with the center line of the head, self alignment will be effected. Likewise, should the wear plate or the support member not be parallel to the bottom of the head, self alignment is provided. Should jack bolts be employed without the balls, the bottom ends of the jack bolt where misalignment is encountered would make more contact on one side causing an increase in friction as well as greater torque and force required to tighten the jack bolts and uneven force distribution on the head.

The tightening device 10 of this invention is shown incorporated in a stress or load indicating fastening device 30 in FIG. 1. The fastening device comprises the bolt 16 and an axial bore 32 in which a stress or load indicating gauge pin 34 is anchored at a threaded end 36 in a tapered hole 38.

A free end 40 of the gauge pin 34 extends from the threaded end portion 14 of the bolt and has a retaining head 42 which retains a rotary stress indicating gauge 43 which freely rotates about the pin end 40 when the fastener 30 is in the untightened and unstressed condition. When the tightening device 10 is tightened against a support sufficiently to place a predetermined load or stress upon the shank 17 of the bolt 16 to tension or stress the shank 17, the rotary gauge is brought to bear against the end portion 14 of the bolt restricting the free rotations of the rotary gauge and thereby indicating that a predetermined stress or load upon the bolt has been obtained.

The tightening device 10 and load indicating fastening device 30 are shown in a typical use in FIG. 1 where a support 44 is to be tightened or clamped against a plate 46. The fastening device 30 is passed through openings in the support and plate. The opening in the support plate is sufficiently large to receive freely the shank 17 of the bolt and provide for tensioning of the shank when the tightening device 10 is tightened. While the fastening device 30 has been shown in the form of a bolt it will be understood that it may be in the form of a threaded stud or the like with one end anchored in the plate 46 and it will also be understood that the tightening device 10 may be employed in the form of the nut as shown or incorporated in the fixed head of the bolt.

USE

The tightening device 10 is very simply employed whether the abutment head is in the form of the nut 12 as shown or whether incorporated in the fixed head of a bolt.

The jack bolts 20 are employed after the abutment head or nut 12 has been brought in contact with the support 44 which may be accomplished by hand tightening the nut 12 against the wear plate 28. Once this has been accomplished, the jack bolts are tightened to force the balls 24 against the wear plate by use of an allen wrench inserted in the bolt socket 23. Access by the wrench may be from a vertical or horizontal position depending upon access availability. This tightening or torquing may be effected with great force by use of appropriate tools and may be done in the usual manner of torquing a wheel or the like by applying torquing force upon opposite nuts in sequence.

In the tightening operation a minimum of friction is encountered due to the hardness of the balls 24 and their interaction with the softer metal of the bolt ends and the wear plate. Should there by any misalignment or slant involved, the balls, through their point-like contact, will self align and by proper torquing make the equalization of force distribution realizable.

The use of the tightening device 10 with the stress or load indicating fastener 30 shown in FIG. 1 is carried out in the same manner as described above. With such a fastener device the compressive force brought to bear by the nut 12 against the support plate is increased to bring a predetermined load upon the shank 17 of the bolt. When the compressive force is of a degree that the tension or stretch of the shank is such that the rotary gauge 43 is brought into engagement against the end portion 14 of the bolt to a tightness that it can no longer rotate freely, there is an indication that the proper loading or stress upon the bolt has been effected to safely and properly clamp the support 44 against the plate 46. Routine checking of the gauge 43 to see whether it will rotate freely will indicate whether additional tightening of the jack bolts 20 is required.

The use of the tightening device 10 with the fastener 30 may be made in various forms of equipment in industry, heavy equipment, construction and the like wherever parts are to be connected or clamped together. The designed load or stress placed on the shank of the bolt or stud is accomplished by varying the clearance or gap of the rotary gauge between the end portion 14 of abutment head whether it be a nut or bolt head and the retainer head 42 of the gauge pin. This feature provides an accurate means of indicating selected design loads or stress when the tightening device 10 is properly tightened.

Various changes and modifications may be made within in this invention and will be apparent to those skilled in the art. Such changes and modifications are within the scope and teaching of this invention as defined in the claims appended hereto.

What is claimed is:

1. In a tightening device having an elongated shank and an abutment head adapted to be tightened against a fixed support provided with an opening receiving said shank, and a plurality of jack bolts threadly engageable with a plurality of threaded holes positioned circumferentially about said abutment head and adapted to exert pressure against said support member, the improvement comprising a plurality of separate and discrete ball members closely receivable within said holes and positioned between bottom ends of said jack bolts and a wear plate supported by said support member, said ball members being composed of a metal having a hardness greater than the bottom ends of said jack bolts.

2. The tightening device of claim 1 in which said ball members further have a hardness greater than said wear plate.

3. The tightening device of claim 1 in which said wear plate is in the form of a washer fitted around the elongated shank of said fastener and underlying a lower portion of said abutment head and said holes.

4. The tightening device of claim 1 in which said elongated shank has a threaded portion thereon and said abutment head is in the form of a nut member threadedly received on said threaded portion of said shank.

5. The tightening device of claim 1 in which said abutment head extends laterally and peripherally beyond the shank and is fixed to said shank.

6. In a stress fastener device having an elongated shank and an abutment head adapted to be tightened against a support member in which the shank has a bore receiving a gauge pin fixed at one end within said bore and extending freely from said end through said abutment head and a rotary gauge member is rotatably connected to said pin between an exterior face of said abutment head and a head portion of the gauge pin, said gauge member being freely rotatable when the abutment head is not tightened against said support member and being compressed against the exterior face of the abutment head when said abutment head is tightened against said support member and said shank is stressed by compression of the head portion of said gauge pin to force said rotary gauge member against the exterior face of said abutment head, the improvement comprising a plurality of jack bolts threadedly engageable with a plurality of threaded holes positioned circumferentially about said abutment head and adapted to exert pressure against said support member, a plurality of separate and discrete ball members closely receivable within said holes and positioned between bottom ends of said jack bolts and a wear plate supported by said support member, said ball members being composed of a metal having a hardness greater than the bottom ends of said jack bolts.

7. The fastener device of claim 6 in which said ball members further have a hardness greater than said wear plate.

8. The fastener device of claim 7 in which said wear plate is in the form of a washer fitted around the elongated shank of said fastener and underlying said abutment head and said holes.

9. The fastener device of claim 6 in which said abutment head is in the form of a nut member threadedly received on a threaded portion of said shank.

10. The fastener device of claim 6 in which said abutment head extends laterally and peripherally beyond the shank and is fixed to said shank.

* * * * *